(12) United States Patent
Jennings et al.

(10) Patent No.: US 7,068,424 B1
(45) Date of Patent: Jun. 27, 2006

(54) MULTIPLE PULSE GENERATION

(75) Inventors: Martyn R Jennings, Filton (GB); Lee D Miller, Filton (GB)

(73) Assignee: MBDA UK Limited, Hertfordshire (GB)

( * ) Notice: Subject to any disclaimer, the term of this patent is extended or adjusted under 35 U.S.C. 154(b) by 454 days.

(21) Appl. No.: 10/247,847

(22) Filed: Sep. 18, 2002

(30) Foreign Application Priority Data

Sep. 19, 2001 (GB) ................. 0123640.5

(51) Int. Cl.
*H01S 3/00* (2006.01)
*G01J 1/04* (2006.01)
*G02B 6/42* (2006.01)

(52) U.S. Cl. .................. 359/349; 385/31; 398/190; 250/227.15

(58) Field of Classification Search ................ 359/349; 385/31; 398/190; 250/227.15
See application file for complete search history.

(56) References Cited

U.S. PATENT DOCUMENTS

| 3,991,318 | A | 11/1976 | Duguay |
| 4,296,319 | A | 10/1981 | Franks et al. |
| 4,442,550 | A | 4/1984 | Killat |
| 5,113,423 | A | 5/1992 | Csonka |
| 5,214,729 | A | 5/1993 | Koai |
| 5,418,360 | A | 5/1995 | Sokolowska et al. |
| 5,446,571 | A | 8/1995 | Shabeer |
| 5,703,708 | A | 12/1997 | Das et al. |
| 5,757,912 | A | 5/1998 | Blow |
| 5,953,142 | A | 9/1999 | Chiaroni et al. |
| 6,141,127 | A | * 10/2000 | Boivin et al. ................. 398/92 |
| 6,760,512 | B1 | * 7/2004 | Pepper ........................ 385/27 |
| 2002/0061164 | A1 | 5/2002 | Hall et al. |
| 2002/0080436 | A1 | 6/2002 | Hait |

FOREIGN PATENT DOCUMENTS

| EP | 0 034 107 | 8/1981 |
| EP | 0 398 038 | 11/1990 |
| EP | 0 905 937 | 3/1999 |
| EP | 0 938 197 | 8/1999 |
| EP | 1 037 413 | 9/2000 |
| EP | 1 099 965 | 5/2001 |
| JP | 56-103548 | 8/1981 |
| WO | WO 00/11765 | 3/2000 |
| WO | WO 01/67642 | 9/2001 |

OTHER PUBLICATIONS

L. Boivin et al, "110 Channels X 2.35 Gb/s from a Single Femtosecond Laser" *IEEE Photonics Technology Letters*, vol. 11, No. 4, Apr. 1999, pp. 466-468.

* cited by examiner

*Primary Examiner*—Mark Hellner
(74) *Attorney, Agent, or Firm*—Nixon & Vanderhye P.C.

(57) ABSTRACT

An electromagnetic radiation (EMR) multiple pulse generator, comprising,
an EMR source for producing discrete pulses of radiation,
an EMR splitter for receiving the pulses of radiation produced by the EMR source, said splitter providing a plurality of EMR transmission paths for the received pulses, each of said transmission paths having physical characteristics for modifying EMR pulses passing through said paths relative to the input pulses,
an EMR combiner for combining the modified outputs of said plurality of EMR transmission paths, and
at least one combined EMR output transmission path for transmitting said combined EMR output.

17 Claims, 3 Drawing Sheets

MULTIPLE PULSE GENERATION

This invention relates to the field of electromagnetic radiation pulse generation and more specifically, but not exclusively, to the use of optical techniques in the generation of multiple electromagnetic pulses from a single input pulse.

The generation of electromagnetic pulses by radiation emitting sources is well known in the arts of communications and sensor systems and numerous electrically based techniques have been developed to enable the encoding of such pulses for subsequent recognition and identification.

The state of the art electrically based techniques used to modify radiation pulses such that they may be readily identified rely on the ability to affect certain characteristics such as pulse length, duration, amplitude, frequency or other characteristics such as rise and decay time. Additionally multiple pulses may be used to further distinguish a generated pulse.

The ability to modify the pulse repetition rate frequency (PRF) for multiple pulses is also a characteristic which can be exploited, but there are present physical and electromagnetic limitations to the maximum PRF that can be achieved.

Accordingly there is provided an electromagnetic radiation (EMR) multiple pulse generator, comprising, an EMR source for producing discrete pulses of radiation, an EMR splitter for receiving the pulses of radiation produced by the EMR source, said splitter providing a plurality of EMR transmission paths for the received pulses, each of said transmission paths having different physical characteristics for modifying EMR pulses passing through said paths relative to the input pulses, an EMR combiner for combining the modified outputs of said plurality of EMR transmission paths, and at least one combined EMR output transmission path for transmitting said combined EMR output.

The combined EMR output may comprise a train of discrete pulses. Alternatively the combined EMR output may comprise a single pulse having a duration longer than that of the input pulse. Alternatively the combined EMR output may comprise a pulse train comprising at least two pulses wherein at least one pulse of the pulse train has a duration longer than that of the input pulse.

In a further embodiment of the invention the EMR multiple pulse generator further comprises switching means for acting on at least one of the transmission paths, the switching means being capable of enabling or disabling the transmission path.

Advantageously the switching means comprise a photonic switch. The switch may be utilised to change the pulse train transmitted from the EMR combiner. Preferably, each of the EMR transmission paths of the EMR splitter comprises a switch. This maximises the number of variations which can be made to the pulse train.

Figure 1:
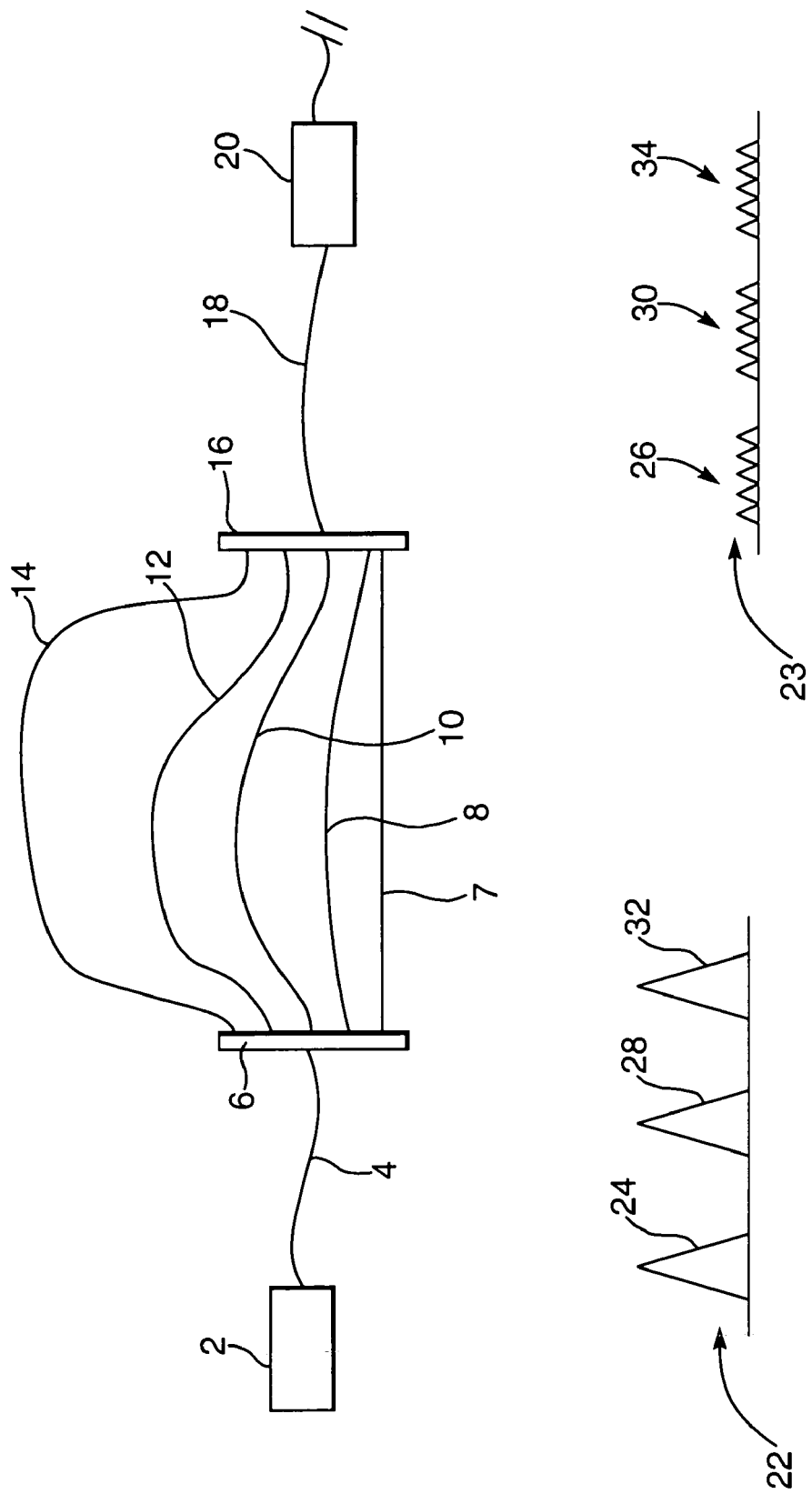

An example of some preferred embodiments of the invention will now be disclosed by way of example only with reference to the following drawings in which;

FIG. 1—shows a first embodiment of an EMR multiple pulse generator in accordance with the invention.

Figure 2:
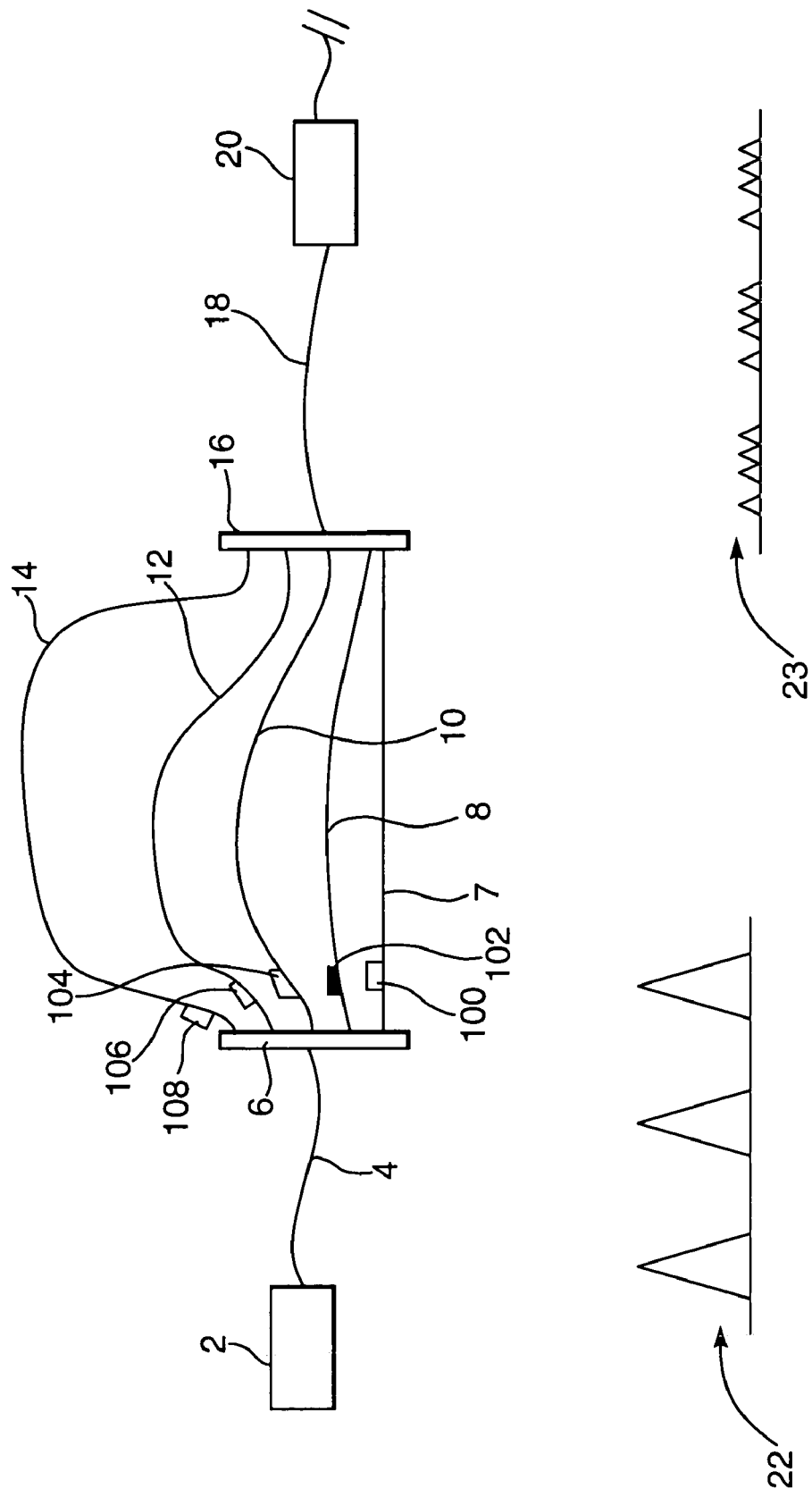

FIG. 2—shows a second embodiment of an EMR multiple pulse generator in accordance with the invention.

Figure 3A:
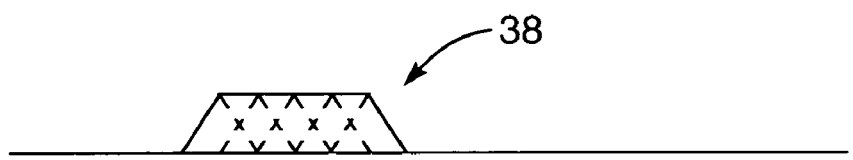
Figure 3B:
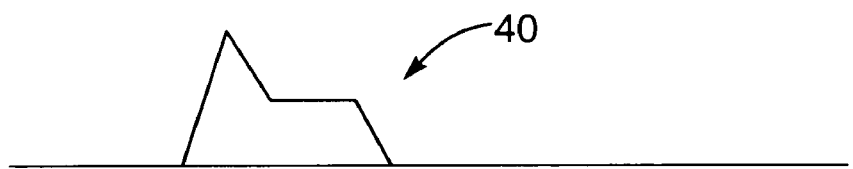
Figure 3C:
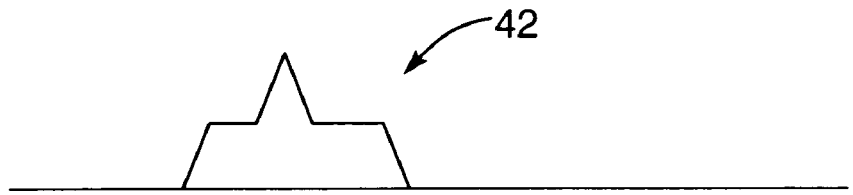

FIGS. 3a to 3c show output pulses which may be obtained using apparatus in accordance with the present invention.

In FIG. 1 a radiation source 2 is shown connected to an EMR splitter 6 via an optical fibre link 4. Radiation pulses (shown 22) generated by the radiation source 2 are transmitted via the optical fibre 4 to the splitter 6 wherein the pulse energy is distributed throughout five optical fibres (7,8,10,12,14) each having different physical characteristics. In this example the optical fibres are delay lines having different time delays, which in the example shown are created by each of said fibres having a different physical length.

Other physical characteristics of the optical fibres may be used to modify the EMR pulses. Various known mechanisms by which features can be induced in materials suitable for transmitting EMR pulses are intended to be included in the scope of the invention and include, but are not limited to, differing physical lengths, differing material properties such as doping to produce frequency shifting, or elements added to the material which change the state of the photons passing through and variations in fibre refractive index.

The resulting production of identifiable modified multiple pulses is known in the art as pulse train coding.

In the example shown in FIG. 1 it is assumed that the energy of the pulse train 22 incident on the splitter 6 is equally distributed amongst the 5 optical delay lines (7,8,10,12,14) each fibre thereby carrying a pulse of ⅕ the total energy of the original pulse unless a gain mechanism is employed in individual delay lines. The generation of increased PRF in the multiple pulse outputs 26,30,34 without any additional energy input is at the expense of individual pulse energy, but provides for a substantial increase in the complexity of the resultant multiple pulse. The multiple pulse generated may be used in detecting targets, where a return signal is required. Although the pulse train (26,30,34) has a lower amplitude than the original single pulse (24,28,32), the detection rate is improved as background noise has less effect on the detection of a pulse train than a single pulse, which might be obscured by a sudden peak in noise.

This feature of the example is not intended to limit its application to such an energy distribution and accordingly pulse energy 22 incident on the splitter 6 could equally have been distributed amongst the delay lines (7,8,10,12,14) in accordance with any fractional distribution regime. Such a system could thereby produce multiple pulses with varying amplitudes between adjacent pulses.

The pulses carried by each of the delay lines (7,8,10,12,14) are recombined in the EMR combiner 16 and transmitted via the combined EMR transmission line 18 to an output device 20. The recombined pulses 23 are characterised in this example by five lower energy increased frequency pulses, the PRF of said pulses being determined by the particular characteristics of the delay lines (7,8,10,12,14).

The output device may typically comprise a communications or signalling device where identification of particular pulse characteristics are required to enable either the receipt or transmission of secure communications or to effect the switching of a transmission or receipt line.

The generation of multiple pulses from the radiation source 2 (shown diagrammatically at 22) produces a series of pulses 24,28,32 which are modified by passing through the splitter 6, delay lines 7,8,10,12,14 and combiner 16 to produce a series of multiple pulses shown respectively at 26,30,34.

The example shown in FIG. 1 utilises the characteristics of equally spaced physical time delays to produce modified multiple pulses 26,30,34. Alternative methods of encoding pulses may also include the use of delay lines with varying time duration between adjacent pulses and/or lines (with or without delays) having differing colours or materials which introduce encoding elements into the resultant multiple pulses which would prove difficult to replicate or copy.

This feature lends the invention to the field of secure communications whereby the transmission and receipt of unique 'signature' pulses comprising known pulse repetition frequencies (e.g. varying or constant) and/or the inclusion of individual pulses within a multiple pulse sequence that may include one or more colours or shifts in energy level could significantly increase the security of such systems.

FIG. 2 shows a radiation source 2 connected to an EMR splitter 6 via an optical fibre link 4. The EMR splitter 6 comprises five optical fibre delay lines (7, 8, 10, 12, 14), each having a different physical length as in the embodiment of FIG. 1. Radiation pulses (shown 22) generated by the radiation source 2 are transmitted via the optical fibre 4 to the splitter 6. The optical fibre delay lines (7, 8, 10, 12, 14) of this embodiment each comprise a switch (100, 102, 104, 106, 108) for enabling or preventing an EMR pulse from travelling along the optical fibre. The switch may be a mechanical switch, or a photonic switch, for example.

In FIG. 2, switches 100, 104, 106 and 108 are configured to allow EMR pulses to travel along the optical fibres 7, 10, 12 and 14 respectively. Switch 102 however is configured to prevent an EMR pulse from travelling along the optical fibre 8. The resulting pulse train 36 is different from the pulse train 23 of FIG. 1. It can be seen that in the embodiment of FIG. 2, the resulting pulse train may be modified by using the switches so that different optical fibres are switched between 'on and off'. The switching can occur rapidly and may be adapted to be remotely controlled.

An advantage of being able to vary the pulse train is that if an unwanted observer became familiar with the pulse train used, the pulse train could be immediately changed without having to modify the pulse generation equipment.

FIG. 3a shows a single output pulse 38 which may be achieved using apparatus similar to that described with respect to FIG. 1. As described in FIG. 1, a radiation source 2 is connected to an EMR splitter 6 via an optical fibre link 4. Radiation pulses 22 generated by the radiation source 2 are transmitted via the optical fibre 4 to the splitter 6 wherein the pulse energy is distributed throughout five optical fibres (7,8,10,12,14) each having different physical characteristics. In the example of FIG. 1 the optical fibres were delay lines having different time delays, which resulted in multiple output pulses 26,30,34 each comprising a train of discrete pulses. In this example, the optical fibres are delay lines having a very small difference in time delay between each of the fibres, so that the radiation pulses arrive at the EMR combiner almost simultaneously, one pulse overlapping with another, such that the resultant output is a single pulse 38 having a duration greater than that of the input pulse 22.

The time delays may be introduced by varying the physical characteristics of the optical fibres (7,8,10,12,14) as described above with respect to FIG. 1.

In this example, the energy of the pulse 22 incident on the splitter 6 is equally distributed amongst the five optical delay lines (7,8,10,12,14), each fibre thereby carrying a pulse of $\frac{1}{5}$ of the total energy of the input pulse 22 unless a gain mechanism is employed in the individual delay lines. Other energy distributions are possible, for example to produce the output pulses 40 or 42 shown in FIGS. 3b and 3c respectively. Similar output pulses to those shown in FIGS. 3b and 3c may also be achieved by permitting more than one delay line to have the same time delay.

Switches such as those described with respect to FIG. 2 may also be used to prevent pulses from travelling along particular fibres, to further vary the output pulse or pulse train.

Other advantages and improvements over state of the art systems will be readily apparent to those skilled in the art and such embodiments and alternative embodiments which utilise the inventive concept of the disclosure contained herein are considered included within the scope of the claimed invention.

The invention claimed is:

1. An electromagnetic radiation (EMR) multiple pulse generator, comprising:
    an EMR source for producing discrete pulses of radiation;
    an EMR splitter for receiving at least one of the pulses of radiation produced by the EMR source, said splitter providing a plurality of EMR transmission paths for said one received pulse, each of said transmission paths having physical characteristics for modifying said one pulse passing through said paths, at least one of said transmission paths having a dedicated switch means for controllably preventing any portion of said one pulse from traversing said at least one of said transmission paths;
    an EMR combiner for combining the modified outputs of said plurality of EMR transmission paths; and
    at least one combined EMR output transmission path for transmitting said combined EMR output.

2. An electromagnetic radiation (EMR) multiple pulse generator as claimed in claim 1 wherein at least two transmission paths introduce different time delays relative to each other, such that the combined EMR output comprises a train of discrete pulses from a single input pulse.

3. An electromagnetic radiation (EMR) multiple pulse generator as claimed in claim 1 wherein said transmission paths introduce different time delays relative to each other, such that the combined EMR output comprises an output pulse train of at least two discrete pulses, wherein at least one pulse of said output pulse train has a duration longer than that of the input pulse.

4. An electromagnetic radiation (EMR) multiple pulse generator as claimed in claim 1 wherein at least two transmission paths introduce different time delays relative to each other, such that the combined EMR output comprises a single pulse having a duration longer than that of the input pulse.

5. An electromagnetic radiation (EMR) multiple pulse generator as claimed in claim 1 wherein a plurality of said transmission paths are each provided with a dedicated switch, each switch being operable to enable or disable the transmission path to which it is dedicated.

6. An electromagnetic radiation (EMR) multiple pulse generator as claimed in claim 1 wherein each of said transmission paths are provided with a dedicated switch, each switch being operable to enable or disable the transmission path to which it is dedicated.

7. An electromagnetic radiation (EMR) multiple pulse generator as claimed in claim 1 wherein the switch is a photonic switch.

8. An electromagnetic radiation (EMR) multiple pulse generator as claimed in claim 1 wherein at least one of the transmission paths is formed from a material having a different composition to that of the other transmission paths.

9. An electromagnetic radiation (EMR) multiple pulse generator as claimed in claim 1 wherein the EMR splitter is adapted to distribute the energy of the pulses of EMR equally amongst the transmission paths.

10. An electromagnetic radiation (EMR) multiple pulse generator as claimed in claim 1 wherein the EMR splitter is adapted to distribute the energy of the pulses of EMR amongst the transmission paths unequally.

11. An electromagnetic radiation (EMR) multiple pulse generator as claimed in claim 1 wherein the transmission path is an optical fibre.

12. A method of encoding an electromagnetic radiation (EMR) pulse train comprising the steps of:
   providing an EMR source to produce discrete pulses of radiation,
   splitting pulses of radiation produced by the EMR source and providing a plurality of EMR transmission paths for the split pulses,
   providing at least one of the transmission paths with a different physical characteristic from other transmission paths,
   controllably disabling at least one of the transmission paths,
   combining the outputs of the plurality of EMR transmission paths,
   transmitting the combined EMR output on an EMR output transmission path; and
   wherein said controllably disabling step prevents the transmission of a pulse of said radiation along said at least one of the transmission paths and thereby encodes the pulse train.

13. A method of encoding an electromagnetic radiation (EMR) pulse train as claimed in claim 12 comprising the further step of providing a plurality of the transmission paths each with a dedicated switch for controllably disabling each associated transmission path.

14. A method of encoding an electromagnetic radiation (EMR) pulse train as claimed in claim 12 comprising the further step of providing each of the transmission paths with a dedicated switch, each switch being operable to enable or disable the transmission path to which it is dedicated.

15. A method of encoding an electromagnetic radiation (EMR) pulse train as claimed in claim 12 comprising the further step of operating a switch at least once between two successive pulses received from the EMR source such that the pulse train is modified during a transmission.

16. A method of encoding an electromagnetic radiation (EMR) pulse train as claimed in claim 13 comprising the further step of operating a switch at least once between two successive pulses received from the EMR source such that the pulse train is modified during a transmission.

17. A method of encoding an electromagnetic radiation (EMR) pulse train as claimed in claim 14 comprising the further step of operating a switch at least once between two successive pulses received from the EMR source such that the pulse train is modified during a transmission.

* * * * *